W. RUNGE.
FEED CONTROL MECHANISM FOR MACHINE TOOLS.
APPLICATION FILED MAR. 6, 1912.
1,052,279.
Patented Feb. 4, 1913.
3 SHEETS—SHEET 1.
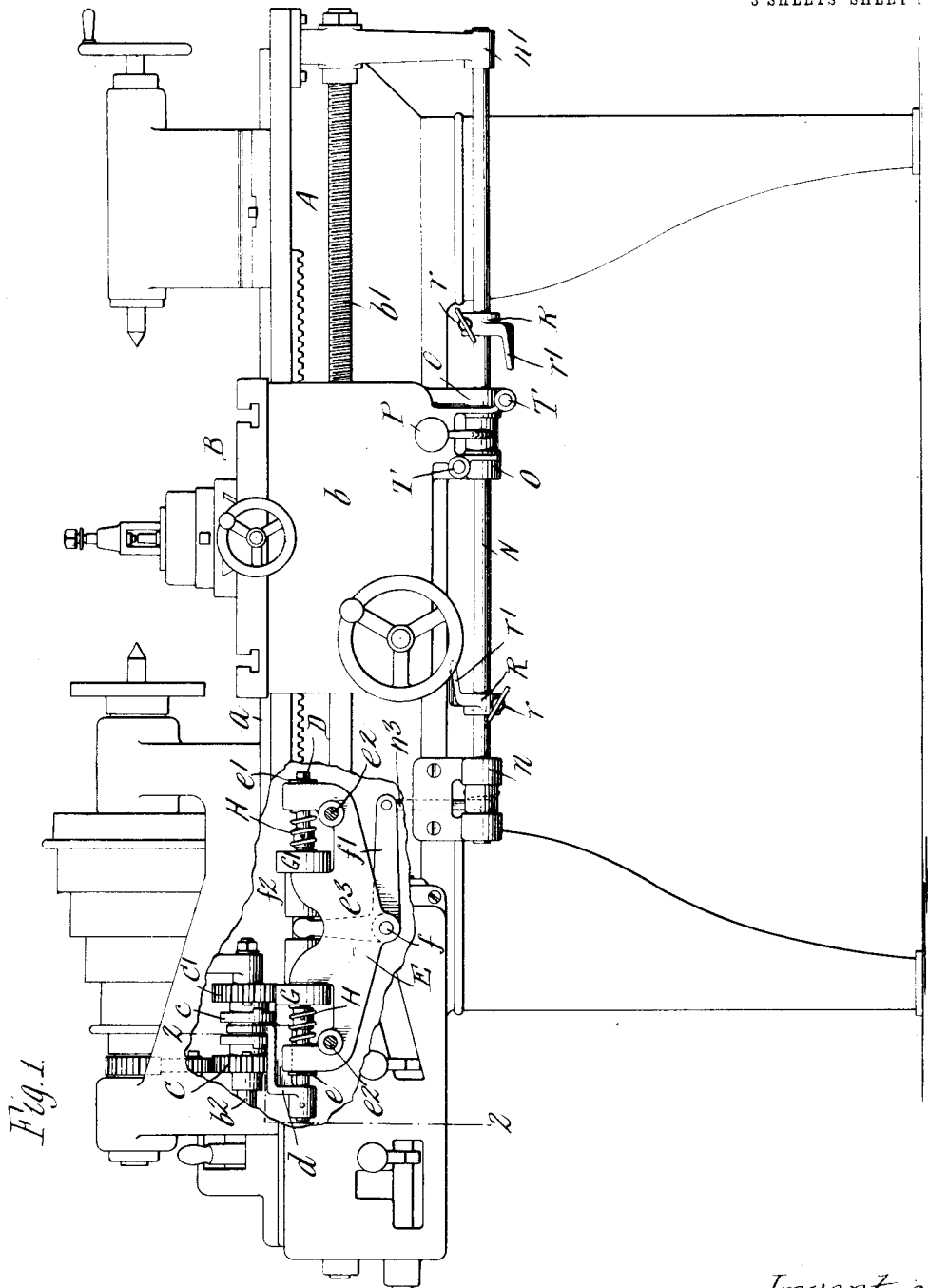
Witnesses.
A. F. Dimond.
L. C. Brinkenhagen
Inventor.
William Runge,
By Wilhelm, Parker & Hard,
Attorneys.

W. RUNGE.
FEED CONTROL MECHANISM FOR MACHINE TOOLS.
APPLICATION FILED MAR. 6, 1912.
1,052,279.
Patented Feb. 4, 1913.
3 SHEETS—SHEET 2.
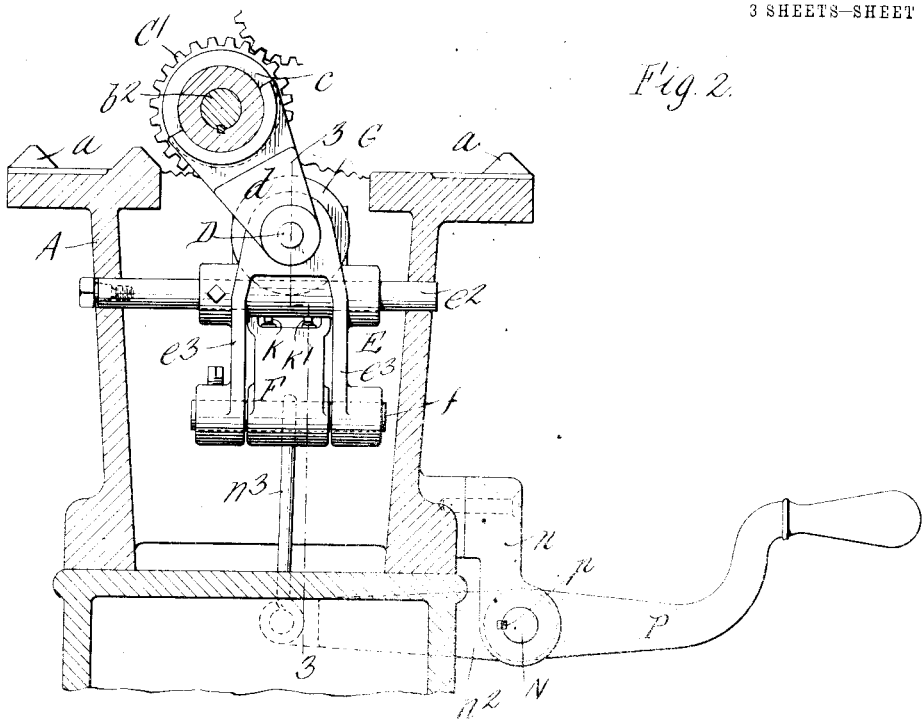
Witnesses.
A. F. Dimond
R. Birkenhagen
Inventor.
William Runge,
by Phelps Parker Hart,
Attorneys.

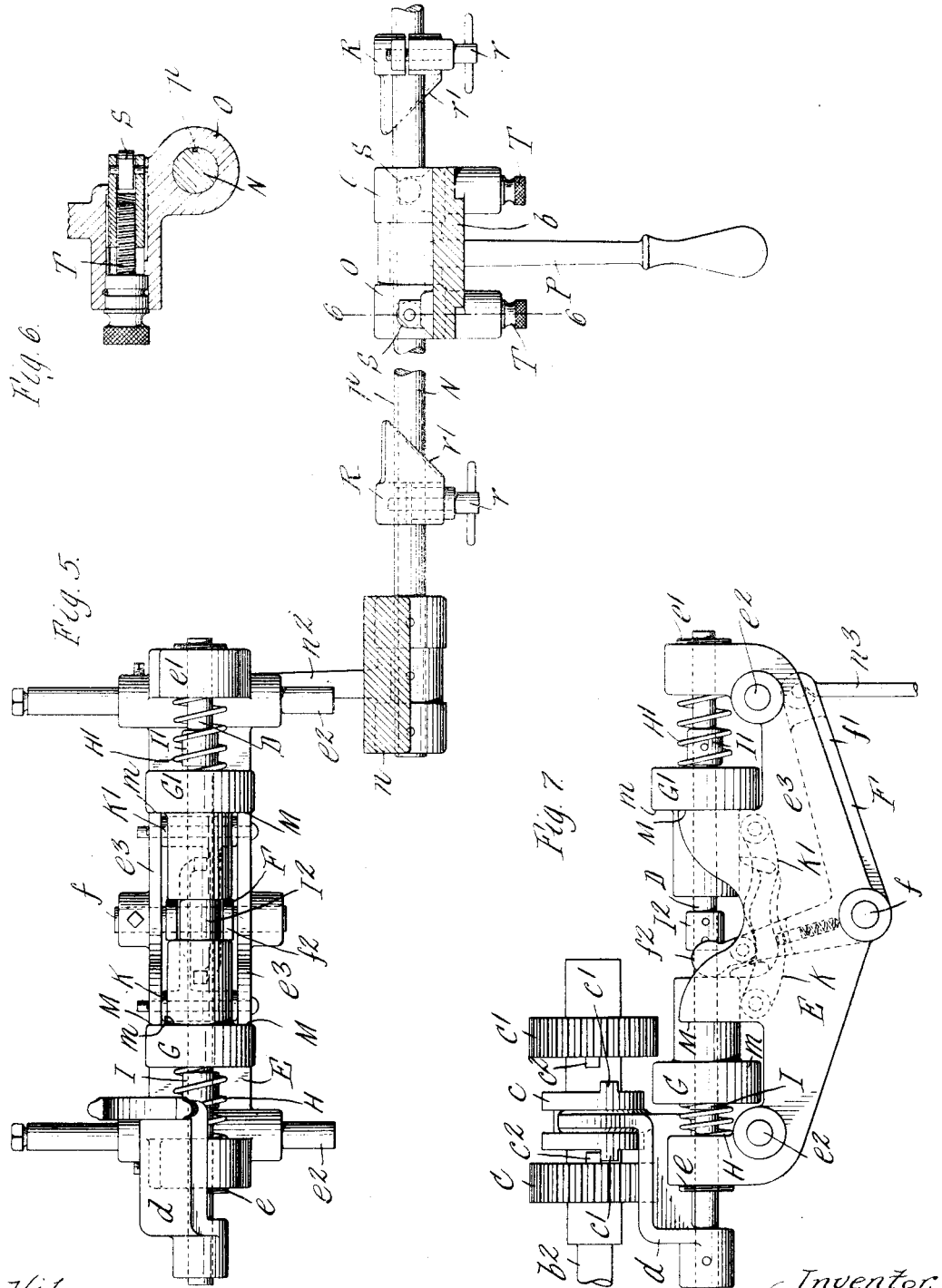

UNITED STATES PATENT OFFICE.

WILLIAM RUNGE, OF SENECA FALLS, NEW YORK, ASSIGNOR TO THE SENECA FALLS MANUFACTURING COMPANY, OF SENECA FALLS, NEW YORK.

FEED-CONTROL MECHANISM FOR MACHINE-TOOLS.

1,052,279.     Specification of Letters Patent.     Patented Feb. 4, 1913.

Application filed March 6, 1912. Serial No. 682,023.

*To all whom it may concern:*

Be it known that I, WILLIAM RUNGE, a citizen of the United States, residing at Seneca Falls, in the county of Seneca and State of New York, have invented a new and useful Improvement in Feed-Control Mechanisms for Machine-Tools, of which the following is a specification.

This invention relates more particularly to improvements in the mechanism employed in lathes for controlling the movements of the feed screw shaft which moves the tool carriage on the lathe bed.

The object of this invention is to produce a positive and accurate controlling mechanism for this purpose which can be easily operated for moving the tool carriage in either direction and for stopping it at any desired point, and which, when operated, produces an immediate or practically instantaneous movement of the driving device for the feed screw to advance, stop or reverse the movement of the tool carriage.

In the accompanying drawings, consisting of three sheets: Figure 1 is a side elevation of a lathe embodying the invention, portions thereof being cut away to show the controlling mechanism for the feed screw. Fig. 2 is a fragmentary transverse sectional elevation thereof in line 2—2, Fig. 1. Fig. 3 is a sectional elevation thereof on line 3—3, Fig. 2. Fig. 4 is a transverse section on line 4—4, Fig. 3. Fig. 5 is a fragmentary top plan view, partly in section, of the controlling mechanism and the operating means therefor. Fig. 6 is a cross-section thereof, on an enlarged scale, in line 6—6, Fig. 5. Fig. 7 is a fragmentary side elevation of the controlling mechanism and the clutch for driving the feed screw.

Like reference characters refer to like parts in the several figures.

The lathe shown in the drawings is, in its general construction, of the usual type comprising the lathe bed A having the ways $a$ upon which is mounted the sliding tool carriage B provided on its front side with a depending apron $b$ and driven in the usual manner by a feed screw $b'$ which is operatively connected with the clutch shaft $b^2$ on which are journaled the feed gear C and the reverse gear C' which are driven in opposite directions from the main drive shaft of the lathe by means not shown. Between the feed gear C and the reverse gear C' on the shaft $b^2$ is mounted a clutch spool $c$ which is slidable endwise of this shaft, but is keyed thereto to turn therewith. The clutch spool $c$, on its opposite end faces, has teeth $c'$ which are adapted to engage with teeth $c^2$ on the adjacent inner faces of the feed and reverse gears when the clutch is shifted into engagement with either of these gears for locking the gear and shaft together. All of these parts are common in lathes and may be of any suitable construction and arrangement.

The present invention relates to the mechanism which is employed for shifting the clutch into and out of engagement with the feed and reverse gears, and for this purpose a clutch shifting rod D is employed which is suitably connected with the clutch spool $c$ as by the forked arm $d$ secured to one end of the rod D and entering a groove in the spool $c$. The clutch shifting rod D is slidably mounted in suitable bearings $e$ $e'$ on a support or frame E so that it is free to move in an endwise direction thereon, and the support E in turn is secured in place on the bed of the lathe by any suitable means, such as the cross rods $e^2$ $e^2$ which extend through holes in opposite ends of this support and have their ends secured in the side walls of the lathe bed A.

For moving the clutch shifting rod D endwise in either direction for shifting the clutch into and out of engagement with the feed and reverse gears C and C', the following construction is employed: The frame E is preferably provided with spaced side walls $e^3$ $e^3$ between which is suitably pivoted at $f$ a bell crank lever F. One arm $f'$ of this lever is suitably connected with operating means for the lever which will be hereinafter more fully described, and the other or free arm $f^2$ extends upwardly between the side walls $e^3$ $e^3$ and has a forked end which is adapted to straddle the central portion of the clutch shifting rod D. The operating lever F, however, may be arranged upon and pivotally secured to the support E in any other suitable manner.

On the rod D, at opposite sides of the forked ends of the lever arm $f^2$, are slidably mounted hammers G G' which are movable endwise of this rod, and between the outer ends of these hammers and the supporting bearings $e$ $e'$ are arranged coiled springs H H', the outer ends of the hammers being preferably enlarged and provided with confining sockets $h$ for the ends of these springs. The supporting bearings $e$ $e'$ are preferably screwed into threaded portions of the support E so that they can be adjusted thereon toward and from the hammers for regulating the tension of these springs.

The clutch shifting rod D is provided with fixed stops or collars I I' at the outer ends of the hammers G G' and with a central fixed stop or collar $I^2$ located between the inner ends of the hammers G G'. These collars or stops limit the endwise movement of the hammers relative to the rod in both directions and are adapted to be struck by the hammers and communicate the blows of the hammers to the clutch shifting rod. When the bell crank lever is moved in either direction, its arm $f^2$ engages the inner end of one of the hammers G G' and drives this hammer along the rod D in opposition to its spring until it strikes the stop collar on that end of the rod toward which it is being driven. The blow of the hammer on the stop collar causes the clutch shifting rod to move endwise in its bearings a sufficient distance to shift the clutch spool into engagement with either the feed gear or the reverse gear, depending upon the direction of movement of the rod. In the construction shown, the upward movement of the arm $f'$ of the bell-crank lever F operates through the lever arm $f^2$, the hammer G and the collar I to move the rod D for shifting the clutch spool into engagement with the feed gear C, as shown in Figs. 3 and 7, while the opposite movement of the bell-crank lever from its neutral position operates through the hammer G' and the collar I' to move the rod D in the opposite direction for shifting the clutch into engagement with the reverse gear C'.

When either hammer is moved to throw the clutch into engagement with one of the gears, the spring for that hammer is compressed and would force the hammer back to its normal position, and thus leave the rod D free to move in a direction to disengage the clutch from the gear which it engages. In order to hold the clutch shifting rod in its shifted position and prevent the return movement of the hammer under the action of its spring, suitable means are employed which, in the construction shown, consists of triggers K K', one for each hammer. These triggers are suitably pivoted between the side walls $e^3$ $e^3$ of the support E at opposite sides of the lever arm $f^2$ and extend in opposite directions between the forked ends of the lever arm, being provided at their free ends with toe portions $k$ which are adapted to engage the inner ends of the hammers when the latter are moved to shift the clutch into engagement with its gears. Spring detents L mounted in suitable sockets $l$ in the lever arm $f^2$ engage the under sides of these triggers and tend to move them into engagement with the hammers, and rollers $l'$ mounted on the inner sides of the forked ends of the lever arm $f^2$ are adapted to engage cam faces $l^2$ on the upper sides of these triggers for forcing the triggers out of engagement with their respective hammers when the lever arm $f^2$ is moved back from its clutch engaging to its clutch releasing position. The clutch releasing movement of the lever arm $f^2$ thus trips the trigger for the hammer which has been shifted, and permits this hammer to fly back under the action of its spring. In this return movement the hammer strikes the central collar $I^2$ on the rod D and moves this rod a sufficient distance to throw the clutch out of engagement with whichever gear it engages. To limit the return movements of the hammers and prevent either hammer from shifting the rod far enough to throw the clutch beyond its neutral position into engagement with the opposite gear, stops M are provided on the side walls $e^3$, $e^3$ of the support E which are adapted to engage shoulders $m$ on the hammers, but any other suitable means may be employed for this purpose. The hammers having a limited movement on the shifting rod, the movement of the operating lever in a direction to engage the clutch with either the feed gear or the reverse gear brings the lever arm $f^2$ into engagement with one of these hammers and moves this hammer freely on the shifting rod so that the hammer will push its companion stop collar and will therefore operate to shift the rod and move the clutch quickly into engagement with the gear. Also when either hammer is released from its holding trigger by the clutch releasing movement of the operating lever, its spring will cause the hammer to strike a sharp blow on the central stop collar on the shifting rod so that the shifting rod and clutch will be moved to disengage the clutch from the gear practically instantaneously. The clutch is, therefore, moved very quickly into and out of engagement with the gear wheels and the parts are thereby relieved from all unnecessary wear in the clutch shifting operations.

For operating the bell-crank lever to shift the clutch into and out of engagement with the feed and reverse gears, the following mechanism is employed: N represents a rock shaft which is mounted in suitable brackets $n$ $n'$ at the front of the lathe bed A below the apron $b$ of the tool carriage B. At its forward end this shaft has an inwardly extending arm $n^2$ fixed thereto which is connected by a link $n^3$ with the arm $f'$ of the bell crank lever F.

The apron $b$ of the tool carriage is provided with depending lugs O which embrace the shaft N, leaving the latter free to rock therein, and between these lugs a handle P is mounted on the rock shaft so that it is free to move endwise of the shaft with the reciprocating movement of the carriage, but is keyed to the shaft to turn therewith, the shaft being provided for this purpose with a longitudinal key way $p$.

On the rock shaft N, at opposite sides of the lugs O are mounted cam collars R which are adjustably clamped thereto by screws $r$. These cam collars can be adjusted endwise of the shaft to any desired position. They are provided with oppositely inclined cam faces $r'$ $r'$ and the lugs O are provided with suitable cam-engaging portions, such as the rollers S S which are adapted to engage these faces, as the tool carriage travels along its way, and rock the shaft in opposite directions a sufficient distance to operate the controlling mechanism for releasing the clutch and thus stopping the movement of the carriage when it is traveling in either direction.

To produce a fine adjustment of the rollers S S for obtaining an accurate release of the clutch at a predetermined point, these rollers are preferably movably mounted in the lugs O and are adapted to be adjusted by screws T provided with heads at the front of the brackets, by turning which the rollers can be adjusted in or out relative to the cam collars as may be necessary to properly time the operation of the clutch. While this fine adjustment of the rollers or other cam-engaging portions of the traveling carriage is desirable, it is not necessary to the satisfactory operation of the machine in ordinary work, as reasonably fine adjustments of the stop mechanism can be obtained by adjusting the cam collars on the rock shaft.

While the described means for operating the bell crank lever is preferred, any other suitable means may be employed for operating the bell crank lever by hand and for automatically actuating the rock shaft by the movement of the tool carriage for releasing the clutch and stopping the carriage at any point in its movement in either direction.

The controlling mechanism operates easily, quickly and effectively for shifting and releasing the clutch and enables the movement of the tool carriage to be accurately and automatically stopped at any desired point. But little pressure between the carriage and the cam collars of the rock shaft is required for rocking the shaft to operate the controlling mechanism for releasing the clutch, and the quick release and engagement of the clutch with its gears produced by the controlling mechanism prevents any unnecessary wear on the engaging edges of the interlocking clutch and gear teeth. By setting the cam collars at any desired points on the rock shaft, the carriage in its reciprocating movements can be accurately and automatically stopped each time at the same point. This materially increases the efficiency of the lathe.

While the controlling mechanism has been described as applied to lathes, it can be used to advantage with other machine tools and other machines having traveling parts which are adapted to be similarly controlled in their movements.

I claim as my invention:

1. The combination with a feed member and a driving device therefor, of a controlling mechanism for said driving device comprising a shifting member, a hammer which is movable relative to said shifting member and is adapted to engage said shifting member after an initial movement of the hammer for moving said shifting member in either direction, an operating device for moving said hammer in one direction, a spring for moving the hammer in the opposite direction, and a trigger for holding the hammer against movement by the spring, which trigger is actuated by said operating device to release the hammer, substantially as set forth.

2. The combination with a feed member and a driving device therefor, of a controlling mechanism for said driving device comprising a movable hammer member, an operating device for moving said hammer member in one direction, a spring for moving said hammer member in the opposite direction, a trigger controlled by said operating device for holding said hammer member against movement by said spring, and a member adapted to be struck and moved by said hammer member in either direction for shifting said driving device, substantially as set forth.

3. The combination with a feed member and a driving device therefor, of a controlling mechanism for said driving device comprising a movable hammer member, an operating device for the hammer member, a member relative to which the hammer member has a limited free movement and which is adapted to be struck and moved by said hammer member for shifting said driving device, a traveling member operated by the feed member, and means connected with said operating device and adapted to be engaged by said traveling member for actuating said device, substantially as set forth.

4. The combination with a feed member and a driving device therefor, of a controlling mechanism for said driving device comprising a movable hammer member, a spring for moving said hammer member in one direction, means for moving the hammer member to compress the spring, a trigger for holding the hammer member against movement by the spring and which is movable to release the hammer member, and a member relative to which the hammer member has a limited free movement and which is adapted to be struck and moved by said hammer member for shifting said driving device, substantially as set forth.

5. The combination with a feed member and a driving device therefor, of a controlling mechanism for said driving device comprising independently movable hammer members, an operating device for moving said hammer members in opposite directions, a member relative to which each hammer member has a limited free movement and which is adapted to be struck and moved in one direction by one hammer member and in the opposite direction by the other hammer member, substantially as set forth.

6. The combination with a feed member and a driving device therefor, of a controlling mechanism for said driving device comprising independently movable hammers, springs for moving said hammers in opposite directions, means for moving the hammers to compress said springs, triggers for holding said hammers against movement by said springs and which are movable to release said hammers, and a member relative to which each hammer has a limited free movement and which is adapted to be struck and moved in one direction by one hammer and in the opposite direction by the other hammer, substantially as set forth.

7. The combination with a feed member and a driving device therefor, of a controlling mechanism for said driving device comprising independently movable hammers, means for moving said hammers in opposite directions, springs for returning said hammers to their initial positions, triggers for holding said hammers against movement by said springs and which are movable to release said hammers, and a member relative to which each hammer has a limited free movement in both directions and which is adapted to be struck and moved in either direction by either hammer, substantially as set forth.

8. The combination with a feed member and a driving device therefor, of a controlling mechanism for said driving device comprising independently movable hammers, a member relative to which each hammer has a limited free movement and which is adapted to be struck and moved by each hammer for shifting the driving device, means for moving said hammers in opposite directions for actuating said member to move the driving device into different driving relations with the feed member, a spring for moving each hammer for actuating said member to move the driving device out of driving relation with the feed member, and means for holding the hammers against movement by the springs and which are movable to release the hammers, substantially as set forth.

9. The combination with a feed member and a driving device therefor, of a controlling mechanism for said driving device comprising independently movable hammers, a member relative to which each hammer has a limited free movement and which is adapted to be struck and moved by each hammer for shifting the driving device, a device for moving said hammers in opposite directions for actuating said shifting member to move the driving device into different driving relations with the feed member, a spring for moving each hammer for actuating said shifting member to move the driving device out of driving relation with the feed member, and triggers for holding said hammers against movement by said springs and which are operated by the hammer moving device to release said hammers, substantially as set forth.

10. The combination with a feed member and a driving device therefor, of a controlling mechanism for said driving device comprising independently movable hammers, a shifting rod on which each hammer has a limited free movement and which has stop portions which are adapted to be struck by each hammer for moving said rod to shift the driving device, an actuating device arranged between said hammers for moving said hammers in opposite directions for actuating said rod to shift the driving device into different driving relations with the feed member, springs arranged at the opposite ends of said hammers for moving said hammers for actuating said rod to shift the driving device out of driving relation with the feed member, and means for holding the hammers against movement by the springs and which are movable to release said hammers, substantially as set forth.

11. The combination with a feed member and a driving device therefor, of a controlling mechanism for moving the driving device into and out of driving relation with the feed member, and an operating mechanism therefor comprising a rock shaft provided with rock arms, a traveling member operated by the feed member and having parts which are adapted to engage said arms for rocking the shaft, and screws for adjusting said parts relative to said rock arms, substantially as set forth.

12. The combination with a feed member and a driving device therefor, of a controlling mechanism for said driving device comprising a movable hammer member, an operating device for the hammer member, and a member relative to which the hammer member has a limited free movement and which is adapted to be struck and moved by said hammer member for shifting said driving device, a rock shaft operatively connected with said hammer operating device and provided with rock arms, and a traveling member operated by the feed member and having parts which are adapted to engage said arms for rocking said shaft, substantially as set forth.

Witness my hand, this 26th day of February, 1912.

WILLIAM RUNGE.

Witnesses:
 EDWARD W. KIPP,
 J. C. DAVIS.